United States Patent [19]

Yagasaki et al.

[11] Patent Number: 5,675,383

[45] Date of Patent: Oct. 7, 1997

[54] ENCODING METHOD, ENCODING UNIT, DECODING METHOD, DECODING UNIT, RECORDING MEDIUM, AND TRANSMISSION METHOD

[75] Inventors: Yoichi Yagasaki; Hideki Koyanagi, both of Kanagawa, Japan

[73] Assignee: Sony Corporation, Tokyo, Japan

[21] Appl. No.: 636,930

[22] Filed: Apr. 24, 1996

[30] Foreign Application Priority Data

Apr. 25, 1995 [JP] Japan ................. 7-101048

[51] Int. Cl.⁶ ............... H04N 7/12; H04N 11/02; H04N 11/04

[52] U.S. Cl. ............... 348/390; 348/716; 386/46

[58] Field of Search ............... 358/342, 336, 358/339; 348/419, 714, 715, 716, 717, 718, 719, 390, 721; 360/18, 20, 60; 370/363, 368, 374, 395; 386/1, 20, 33, 46, 90–91, 111–112; H04N 7/12, 11/02, 11/04

[56] References Cited

U.S. PATENT DOCUMENTS

| | | | |
|---|---|---|---|
| 5,134,475 | 7/1992 | Johnston et al. | 358/133 |
| 5,432,769 | 7/1995 | Honjo | 369/60 |
| 5,459,516 | 10/1995 | Song | 348/402 |
| 5,475,499 | 12/1995 | Taguchi | 358/341 |
| 5,537,156 | 7/1996 | Katayama | 348/16 |

*Primary Examiner*—Andrew Faile
*Assistant Examiner*—Vincent Boccio
*Attorney, Agent, or Firm*—William S. Frommer; Alvin Sinderbrand

[57] ABSTRACT

An improvement in solving the problem of the wraparound state. A moving image is coded in an encoder. The resulting coded data is supplied to a buffer through a multiplexor and stored in the buffer. The address used for storing the coded data in the buffer is generated in an address controller. The coded data supplied from the encoder is combined with the address in the multiplexor in a multiplexing manner.

24 Claims, 13 Drawing Sheets

IMMEDIATELY BEFORE T1

IMMEDIATELY BEFORE T2

T4

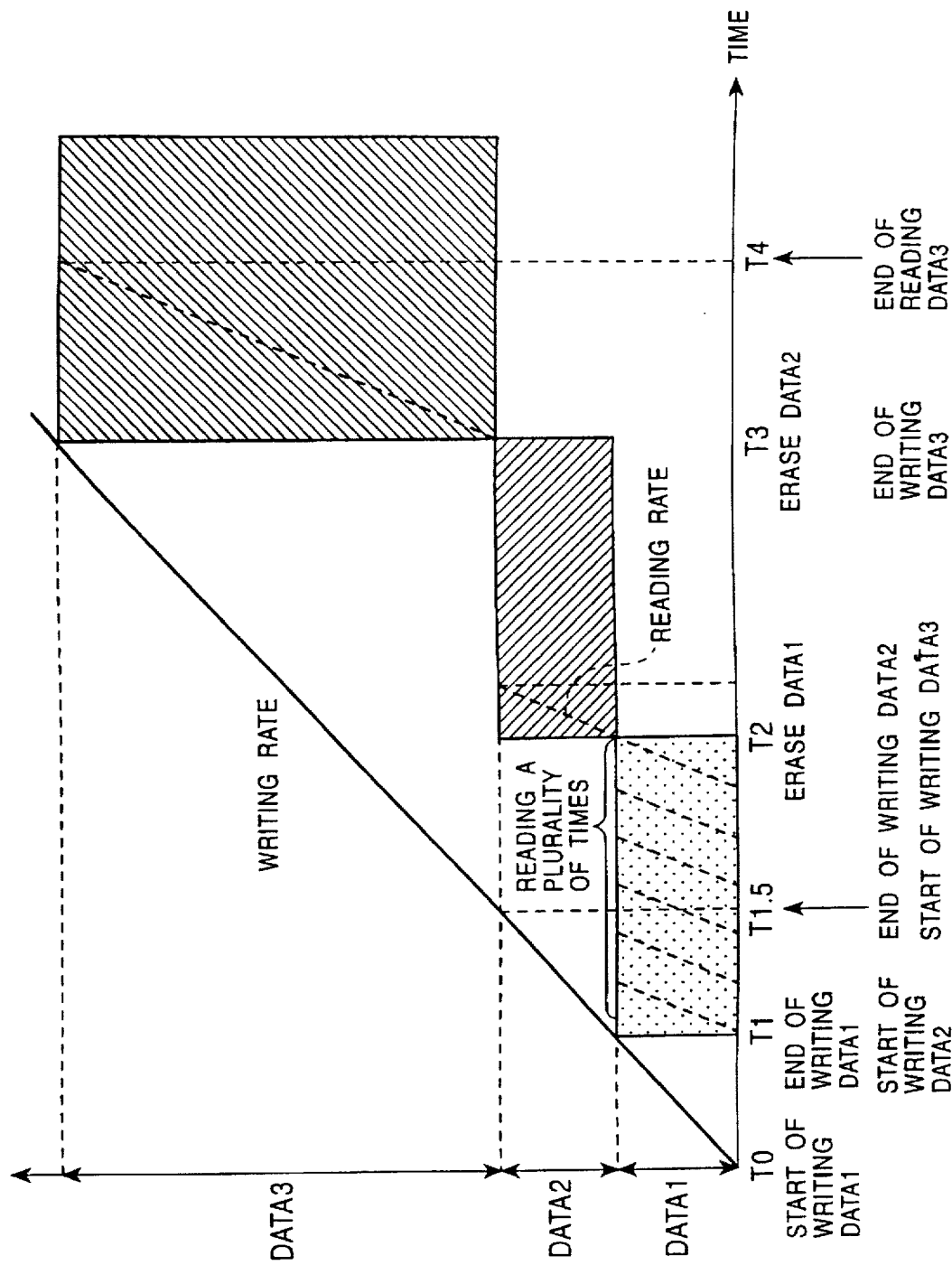

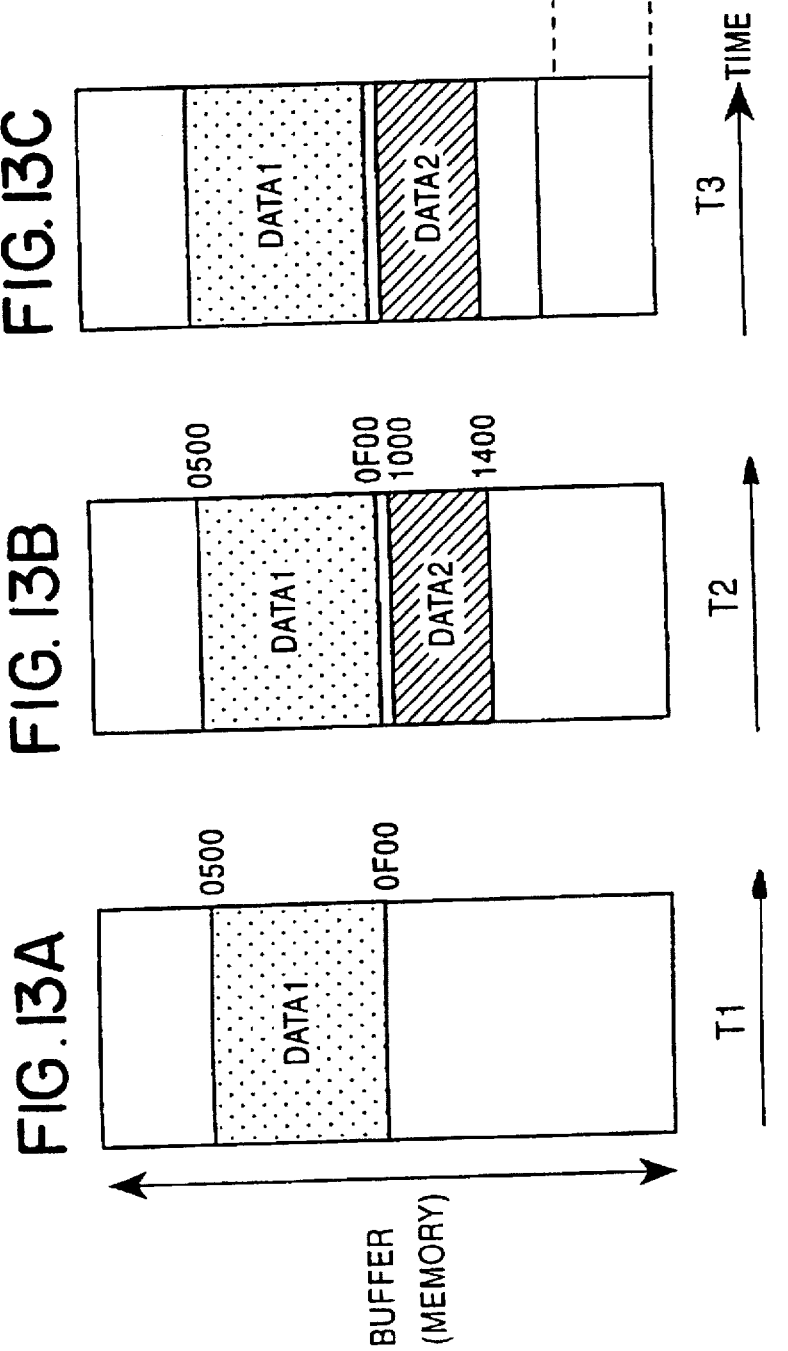

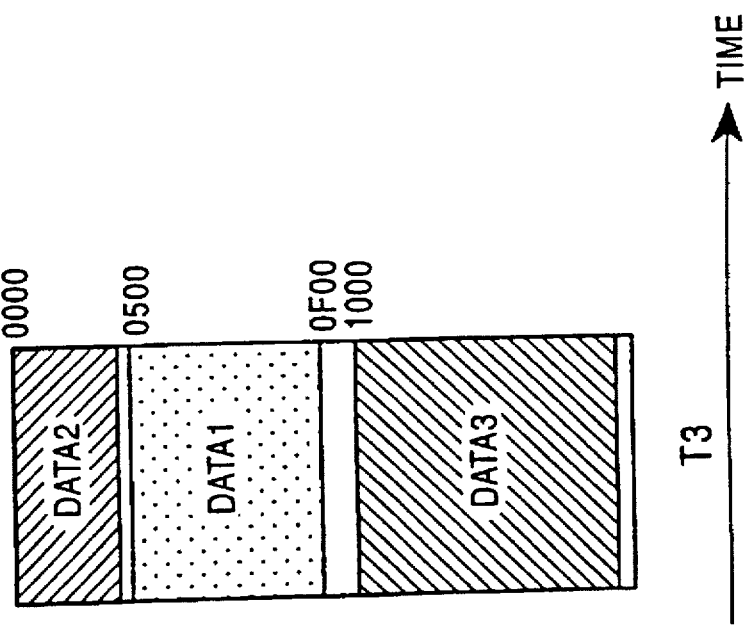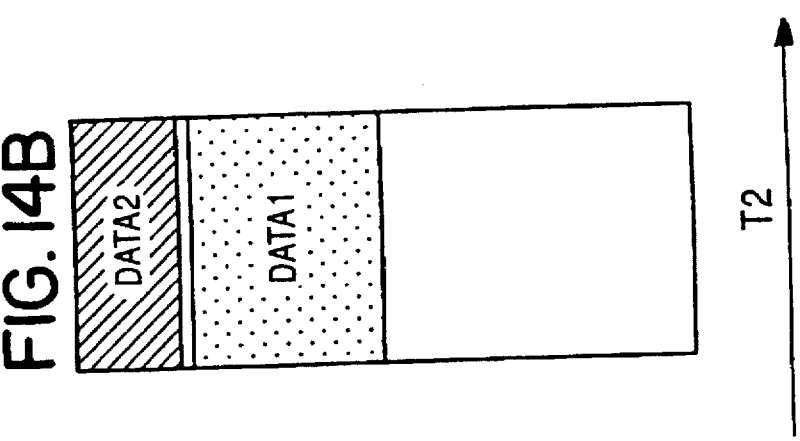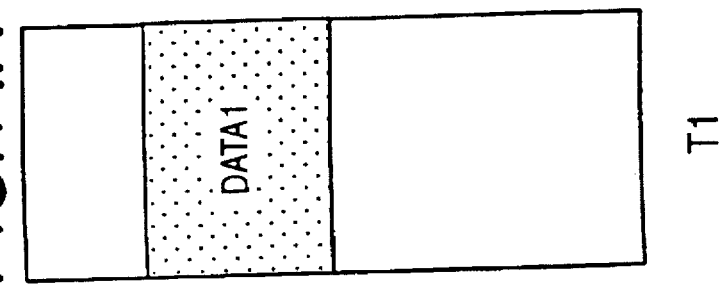

ENCODING METHOD, ENCODING UNIT, DECODING METHOD, DECODING UNIT, RECORDING MEDIUM, AND TRANSMISSION METHOD

BACKGROUND OF THE INVENTION

1. Field of the Invention

The present invention relates to an encoding method, an encoding unit, a decoding method, a decoding unit, a recording medium, a transmission method, and a coding and decoding system, suitable for encoding moving images and recording them in the recording medium, such as video tape, video disk or the like, or transmitting them in a television broadcasting system or a videoconference system.

2. Description of the Related Art

FIG. 1 illustrates an example of the configuration of a conventional encoding unit 110 for encoding moving images and also shows an example of the configuration of a conventional decoding unit 130 for decoding the data encoded by the encoding unit 110. In the encoding unit 110, continuously-input images (moving images in time sequence) are first encoded in an encoder 3, and the encoded data is thus output. The encoder is adapted to reduce time redundancy and spatial redundancy in the original moving image by such means as obtaining interframe difference or executing discrete cosine transformation (DCT) processing. Accordingly, portions of an input image having a great degree of redundancy are compressed, while portions having a small degree of redundancy are not compressed very much. As a result, the continuity of the coded data cannot be ensured.

For overcoming the above-described drawback, the coded data output from the encoder 3 is temporarily stored in a buffer 2 and is output as consecutive data. The address used for storing the coded data in the buffer 2 (hereinafter referred to as "the writing address" as necessary) and the address used for reading the coded data stored in the buffer 2 (hereinafter referred to as "the reading address" as necessary) are generated from an address controller 101. Supplied to the address controller 101 from the encoder 3 are the amount of the coded data output from the encoder 3 and other information. The address controller 101 controls, based on this information, the writing address and the reading address.

On the other hand, the buffer 2 is adapted to supply its available capacity (obtained by subtracting the storage amount of the coded data from the total storage capacity of the buffer 2) (hereinafter referred to as "the available capacity of the buffer 2) to the encoder 3. The encoder 3 sets, based on the available capacity of the buffer 2, parameters for determining the amount of the coded data (for example, the quantizing step taken when the original image data is quantized). This prevents occurrences of overflow and underflow of the buffer 2. The (consecutive) coded data output from the buffer 2 is recorded in a recording medium 111 or is transmitted through a transmission channel 12 so as to be input into the decoding unit 130.

In the decoding unit 130, the coded data input from the encoding unit 110 passes through a buffer 21 and is fed to a decoder 22 in which the data is decoded and transformed to the original image (decoded image). When this decoding operation is performed, the time when the coded data is fed to the decoder 22 does not coincide with the time when the data is actually decoded. For making adjustments to this timing (time), the coded data is temporarily stored in the buffer 21 and is supplied to the decoder 22 according to the status of the decoder 22.

The address used for storing the coded data in the buffer 21 (hereinafter also referred to as "the writing address" as necessary) and the address for reading the coded data stored in the buffer 21 (hereinafter also referred to as "the reading address" as necessary) are generated from an address controller 123. Supplied to the address controller 123 from the decoder 22 are the amount of the coded data processed in the decoder 22 and other information. The address controller 123 controls, based on this information, the writing address and the reading address.

It is necessary that the buffers 2 and 21 be constructed of memory in which the first data input is first output according to a method, what is referred to as "the First In First Out (FIFO) method". The address controllers 101 and 123 are constructed to set the writing address and the reading address so that the buffers 2 and 21 can be operated as FIFO memory.

FIG. 2 schematically illustrates the internal status of the buffer 2 (the same applies to the buffer 21), and in other words, illustrates the address space of the buffer 2. It should be noted that the addresses described in the specification and shown in the accompanying drawings are represented in hexadecimal. Referring to FIG. 2 (the same applies to subsequent drawings illustrating address space), the buffer 2 (21) is represented as memory having the address space in a range from address 0000 to FFFF. Also in FIG. 2 (the same applies to subsequent drawings illustrating address space), "empty" refers to a zone in which data is not stored (or unnecessary data is stored).

FIG. 2 shows that the writing of data 1 has started at address 0010 and ended at 8100, and the writing address is thus located at 8100 at the present time. On the other hand, the reading address is positioned at 0010, and the data can thus be read from address 0010. Both the writing address and the reading address are controlled so as to simply increment, for example, by one, whereby ordinary memory can be used as FIFO memory. When either of the writing address or the reading address reaches address FFFF (the end address of the memory (the buffer 2 or 21)), it is adapted to return to address 0000 (the leading address of the memory).

The buffer 2 (21) shown in FIG. 2 is constructed in the manner described above. That is, when the writing address reaches address FFFF, it automatically returns to address 0000 in order to continue to write data. This reverses the order the reading address and the writing address, as shown in FIG. 3. More specifically, the writing address precedes the reading address until either of the writing address or the reading address reaches address FFFF. When the writing address reaches address FFFF, however, it jumps to address 0000, and thereafter once again increments, such as 0001, 0002, . . . Meanwhile, since the reading address continues to simply increment until it reaches address FFFF after the writing address is started from address 0000, it precedes the writing address. This refers to as "wraparound state". Subsequently, when the reading address reaches address FFFF, it jumps to address 0000, whereby the order of the reading address and the writing address are returned to the original state. In this manner, the buffer 2 (21) operates as FIFO memory.

The wraparound state may raise a problem depending on the configuration of the encoding unit 110 (the same applies to the decoding unit 130). Namely, for example, the command used for executing the function of simply incrementing the reading address and the writing address by one is contained in an address register for storing an address (not shown) provided for the address controller 101 (123). Thus, this function can be executed at a sufficient speed. However, the wraparound state makes the address inconsecutive. It is thus necessary that a subsequent address (the leading address 0000 in the buffer 2 (21) shown in FIG. 3) be stored in predetermined memory and then read from the memory and set in the address register. This operation may be lengthy, and the above-described function sometimes cannot be performed at a sufficient speed.

One of the methods for preventing the wraparound state is the garbage collection method. In this method, if the zone staring from the leading address 0000 in the address space of the buffer 2 (21) is available, the data stored in a different zone is shifted to the leading address 0000 of the buffer 2 at a predetermined timing. More specifically, for example, as illustrated in FIG. 4A, when data 1 is stored in the zone from address 0100 to address 02FF, and subsequently, data 2 is stored in the zone from address 0300 to 06FF, both data 1 and data 2 are shifted to the zone from address 0000 to 01FF and to the zone from address 0200 to 04FF, respectively, as shown in FIG. 4B. This method, on principle, prevents the occurrence of wraparound state.

However, the above-described garbage collection method encounters the following problems. Since the data shifting inevitably requires reading and writing operations of the data, high-speed processing is essential. A work area is also required for storing the data which has been temporarily read. This requires the use of memory having a large capacity and fast access time. Such a memory is, however, expensive, and it is thus sometimes difficult to implement the garbage collection method in terms of costs.

Another method for overcoming the problems inherent in the wraparound state is the two-bank method. In this method, as illustrated in FIG. 5A, memory (the buffers 2 and 21 shown in FIG. 1) is divided into bank 1 and bank 2 which are alternately used for reading and writing operations. Namely, for example, as shown in FIG. 5B, it will now be assumed that data 1 to be read is stored in bank 1. It is thus determined that the bank 1 and the bank 2 are used as reading and writing zones, respectively. Data 2 is written into bank 2 while the data 1 is read from the bank 1. Upon completion of reading the data 1 from the bank 1, as illustrated in FIG. 5C, the data 1 in the bank 1 is first erased, and the writing and reading zones are then swapped with each other, whereby the bank 1 and the bank 2 can be employed as the writing zone and the reading zone, respectively. This swapping operation guarantees that the data is always written from the leading address of the bank 1 or the bank 2. It is thus possible to avoid the wraparound state.

The two-bank method, however, presents the following problem. In this method, subsequent data cannot be written until the reading of the preceding data from the bank used for the reading zone is ended and the data is completely erased. This may cause trouble in the decoding unit 130, which will be explained in a greater detail with reference to FIGS. 6 and 7. More specifically, FIG. 6 indicates a lapse of time when coded data input into the decoding unit 130 in the order of data 1, 2 and 3 is written into and read from the buffer 21. In FIG. 6 (the same applies to FIG. 11 described below), the vertical axis indicates the arrangement of data, while the horizontal axis represents a lapse of time. The solid line increasing in the right direction designates the writing rate (speed) at which the data passing through the recording medium 111 or the transmission channel 12 is written into the buffer 21, while the dotted line increasing in the right direction indicates the reading rate (speed) at which the data is read from the buffer 21. The degrees of the slopes of the solid line and the dotted line represent the writing rate and the reading rate, respectively. In FIG. 6, since the degree of the slope of the dotted line is greater than that of the solid line, the reading rate is higher than the writing rate.

It will now be assumed that the encoding operation in pursuant to the Moving Picture Experts Group (MPEG) standards is performed in the encoder 3. Consequently, each of data 1, 2 and 3, i.e., data per unit (unit data), corresponds to data obtained by coding a piece (one frame or one field) of original image in compliance with the MPEG standards, or corresponds to a group of moving images coded according to the MPEG standards, that is, the Group of Picture (GOP). Which unit (frame, GOP, macro block or the like) is used as the unit data (each of data 1, 2, 3, ... ) is determined by the capacity of the buffer 2 and the amount of coded data.

Returning to FIG. 6, the writing of the data 1 into the bank 1 is started at time T0 and is ended at time T1. Simultaneously, at time T1 the reading of the data 1 from the bank 1 is started, and the writing of the data 2 into the bank 2 is also initiated. In this operation, the data 1 written into the bank 1 may, in some cases, be read a plurality of times during the period from T1 to T2. Namely, for example, when an instruction is given to perform still picture reproduction on the data 1 obtained by coding a piece of original image, the data 1 is repeatedly read from the bank 1 during the period of reproduction. Alternatively, for example, when an instruction is given to perform trick reproduction (a special type of reproduction), such as reverse reproduction, on the data 1 which is a GOP, the frame which has been temporarily decoded is required to be once again decoded, since the display order and the coding order do not coincide with each other in compliance with the MPEG standards. This also causes the data 1 (part of the data 1) to be repeatedly read from the bank 1.

The data 1 read from the buffer 21 a plurality of times under the circumstances discussed above is also repeatedly decoded in the decoder 22 and is output as a decoded image. During this period, the data 1 read from the buffer 21 cannot be immediately erased because it may be continuously read, and as shown in FIG. 6, it is required to be stored in the buffer 21 until time T2. Further, since the data 2 stored in the bank 2 cannot be erased yet, no data can be written into either of the bank 1 or the bank 2 until time T2, i.e., during the period from the end of writing the data 2 into the bank 2 until the erasing of the data 1 from the bank 1.

Thereafter, when still reproduction or special reproduction is terminated so as to eliminate the need for decoding the data 1, the data 1 is erased from the bank 1 at time T2 in FIG. 6. This makes the bank 1 available for writing new data, and the writing of data 3 is thus started. Namely, the writing of the data 3 can be started only after a lapse of time at the end of writing the data 2. At time T2, the reading of the data 2 stored in the bank 2 is also started. At time T3, the data 2 stored in the bank 2 is erased, and also, the reading of the data 3 stored in the bank 1 is started.

If the writing of the data 3 is started after a lapse of time at the end of writing the data 2 and also takes time, since the data 3 has a large amount, the reading of the data 3 overtakes the writing of the data 3 (the portion indicated by the mark • at the intersection between the solid line indicating the writing rate and the broken line designating the reading rate in FIG. 6), since the reading rate is higher than the writing rate as discussed above. This makes it difficult to continuously obtain the coded image of the data 3. Namely, as illustrated in FIG. 6, the writing of the data 3 started at time T2 lasts until time T5, while the reading of the data 3 started at time T3 is ended at time T4, at which the writing of the data 3 is not completely ended, thereby causing underflow of the buffer 21.

FIG. 7 illustrates the status (address space) of the buffer 21 when the two-bank method is employed. At time T1, as shown in FIG. 7A, the writing of the data 1 into the bank 1 is completed, and subsequently, at time T2, the writing of the data 2 into the bank 2 is completed, as illustrated in FIG. 7B. At time T4, however, as shown in FIG. 7C, the writing of the data 3 into the bank 1 is not finished, namely, the writing of the data 3 cannot precede the reading of the data 3, whereby underflow occurs in the buffer 21. This is an intrinsic problem of the two-bank method.

This method also presents a problem of restricting the flexibility of the buffer 21. More specifically, according to this method, since the buffer 21 is divided into the bank 1 and the bank 2, each having the size of one half of the whole buffer 21, the flexibility of taking advantage of the overall size of the buffer 21 is impaired.

SUMMARY OF THE INVENTION

Accordingly, in view of the above background, it is an object of the present invention to provide an improvement in solving the problem of the wraparound state.

In order to achieve the above object, according to a first aspect of the present invention, there is provided a moving-image coding method comprising the steps of: performing a predetermined coding operation on an input moving-image signal to generate coded data; generating a writing address representing the position in which the coded data is written into storage means used for outputting data to a transmission channel at a predetermined rate; combining the coded data with the writing address in a multiplexing manner to generate multiplexed data; and transmitting the multiplexed data to the transmission channel.

According to a second aspect of the present invention, there is provided a moving-image coding unit comprising: coding means for performing a coding operation on an input moving-image signal to generate coded data; storage means for outputting data to a transmission channel at a predetermined rate; writing-address generating means for generating a writing address representing the position in which the coded data is written into the storage means; multiplexed-data generating means for combining the coded data with the writing address in a multiplexing manner to generate multiplexed data; and transmission means for transmitting the multiplexed data to the transmission channel.

According to a third aspect of the present invention, there is provided a coded-data transmission method comprising the steps of: performing a predetermined coding operation on an input moving-image signal to generate coded data; and transmitting the coded data to a transmission channel, wherein the coded data is combined in a multiplexing manner with a writing address representing the position in which the coded data is written into storage means, and transmits the multiplexed data to the transmission channel, the storage means being used for outputting data to the transmission channel at a predetermined rate.

According to a fourth aspect of the present invention, there is provided a moving-image decoding method for decoding transmitted coded data including predetermined control information, comprising the steps of: separating the predetermined control information and coded moving-image data from the coded data including the control information, the control information including a writing address representing the position in which the coded moving-image data is written into storage means used for temporarily storing data transmitted at a predetermined rate; writing the coded moving-image data into the storage means according to the writing address; reading the coded moving-image data from the storage means after the data has been stored in the storage means; and decoding the coded moving-image data read from the storage means to generate moving-image data.

According to a fifth aspect of the present invention, there is provided a moving-image decoding unit for decoding transmitted coded data including predetermined control information, comprising: storage means for temporarily storing data transmitted at a predetermined rate; separation means for separating the control information and coded moving-image data from the coded data including the control information, the control information including a writing address representing the position in which the coded moving-image data is written into the storage means; writing means for writing the coded moving-image data into the storage means according to the writing address; reading means for reading the coded moving-image data from the storage means after the data has been stored in the storage means; and means for decoding the coded moving-image data read from the storage means to generate moving-image data.

According to a sixth aspect of the present invention, there is provided a recording medium in which coded data is recorded, comprising: a header section for recording control data for controlling the coded data; and a data section for recording the coded data, wherein the coded data and a writing address are recorded in the data section in a multiplexing manner, the writing address representing the position in which the coded data is written into storage means provided for a decoding unit, the storage means being used for temporarily storing the coded data.

BRIEF DESCRIPTION OF THE DRAWINGS

FIG. 11 illustrates the writing of data into and reading of data from the buffer 21 shown in FIG. 8;

FIG. 13 illustrates a control method for the buffer 2 when the multipath coding method is not employed; and FIG. 14 illustrates a control method for the buffer 2 when the multipath coding method is employed.

DESCRIPTION OF THE PREFERRED EMBODIMENTS

Figure 1:
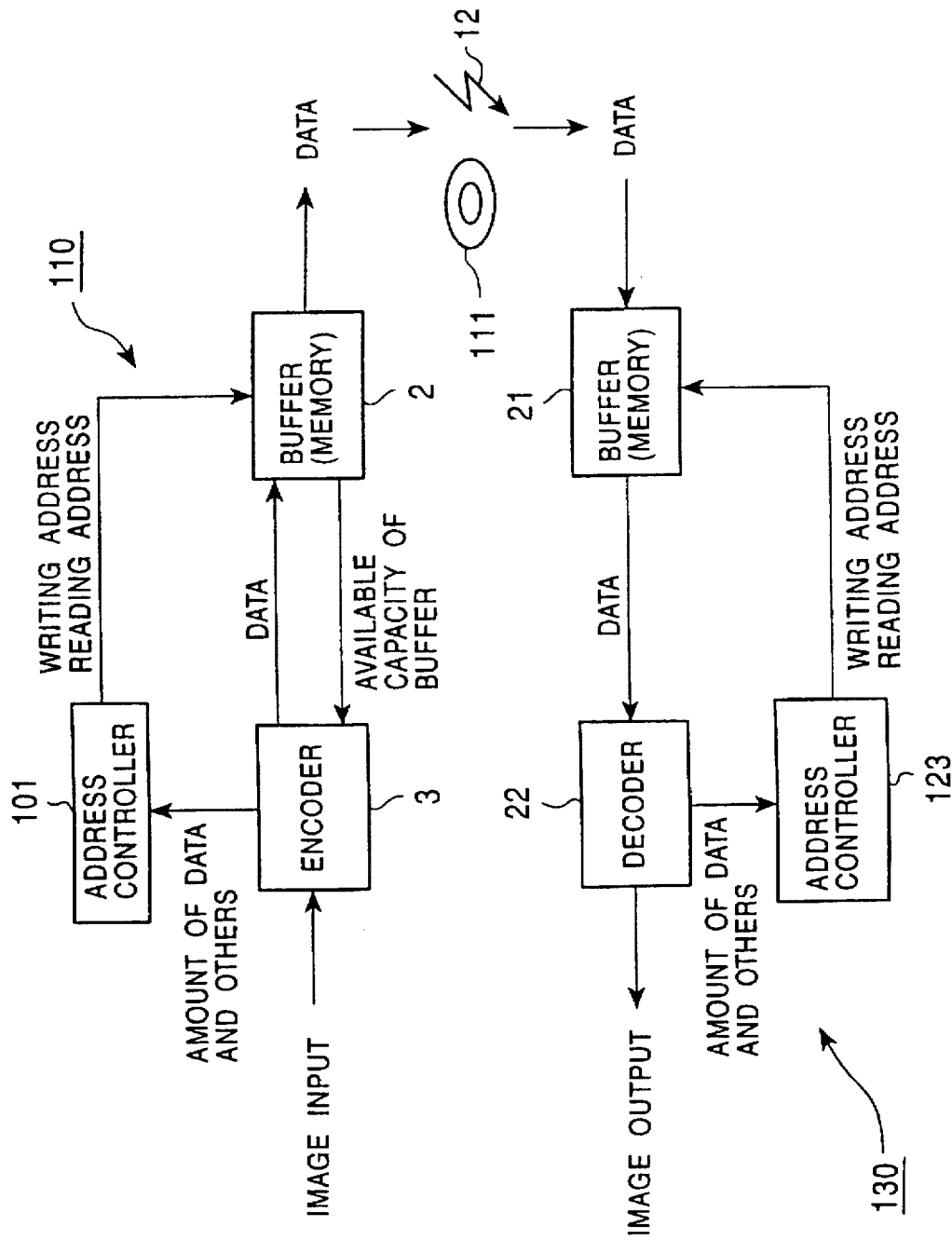
FIG. 1 is a block diagram of an example of the configuration of a conventional coding unit and a decoding unit.
Figure 2:
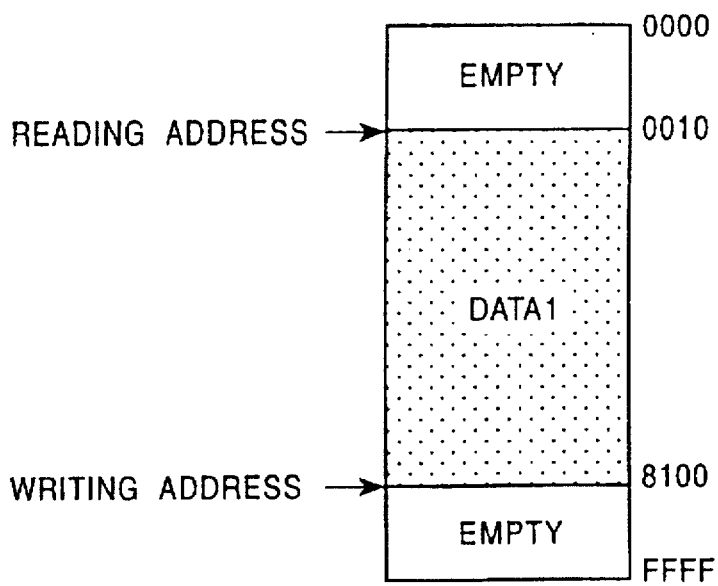
FIG. 2 illustrates the FIFO method.
Figure 3:
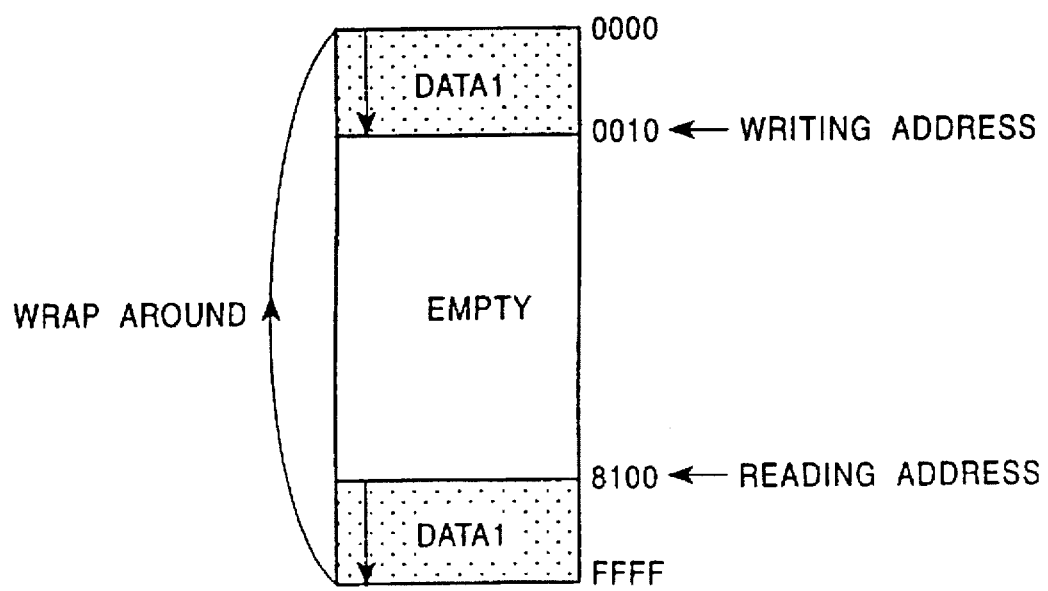
FIG. 3 illustrates the wraparound state.
Figure 4:
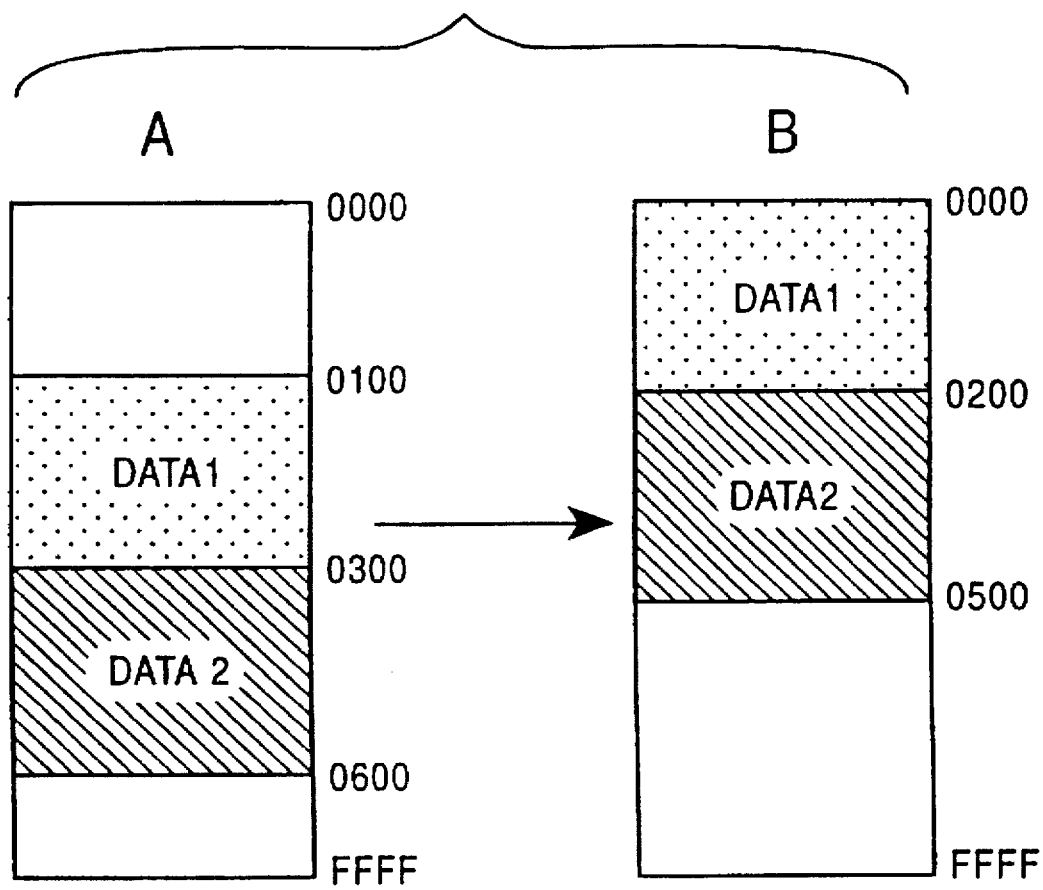
FIG. 4 illustrates the garbage collection method.
Figure 5C:
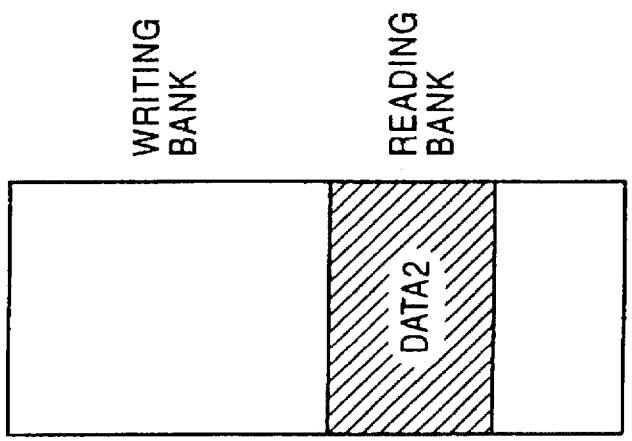
FIG. 5, which is comprised of FIGS. 5A, 5B and 5C, illustrates the two-bank method.
Figure 5B:
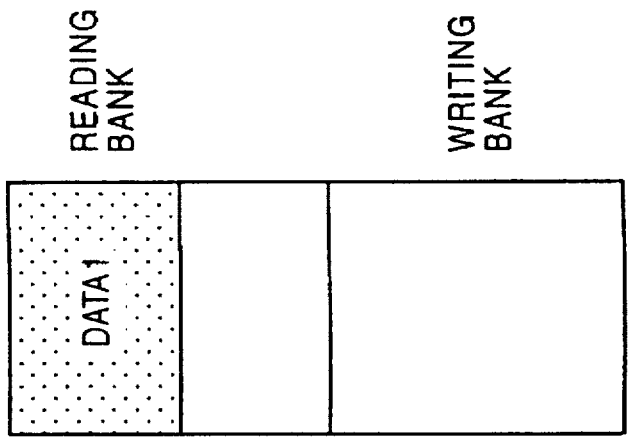
Figure 5A:
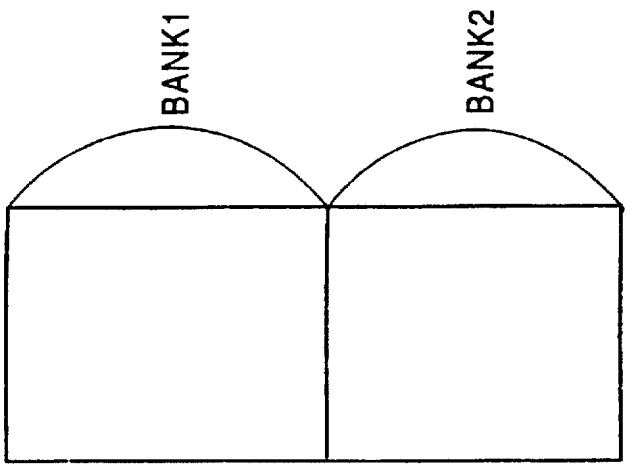
Figure 8:
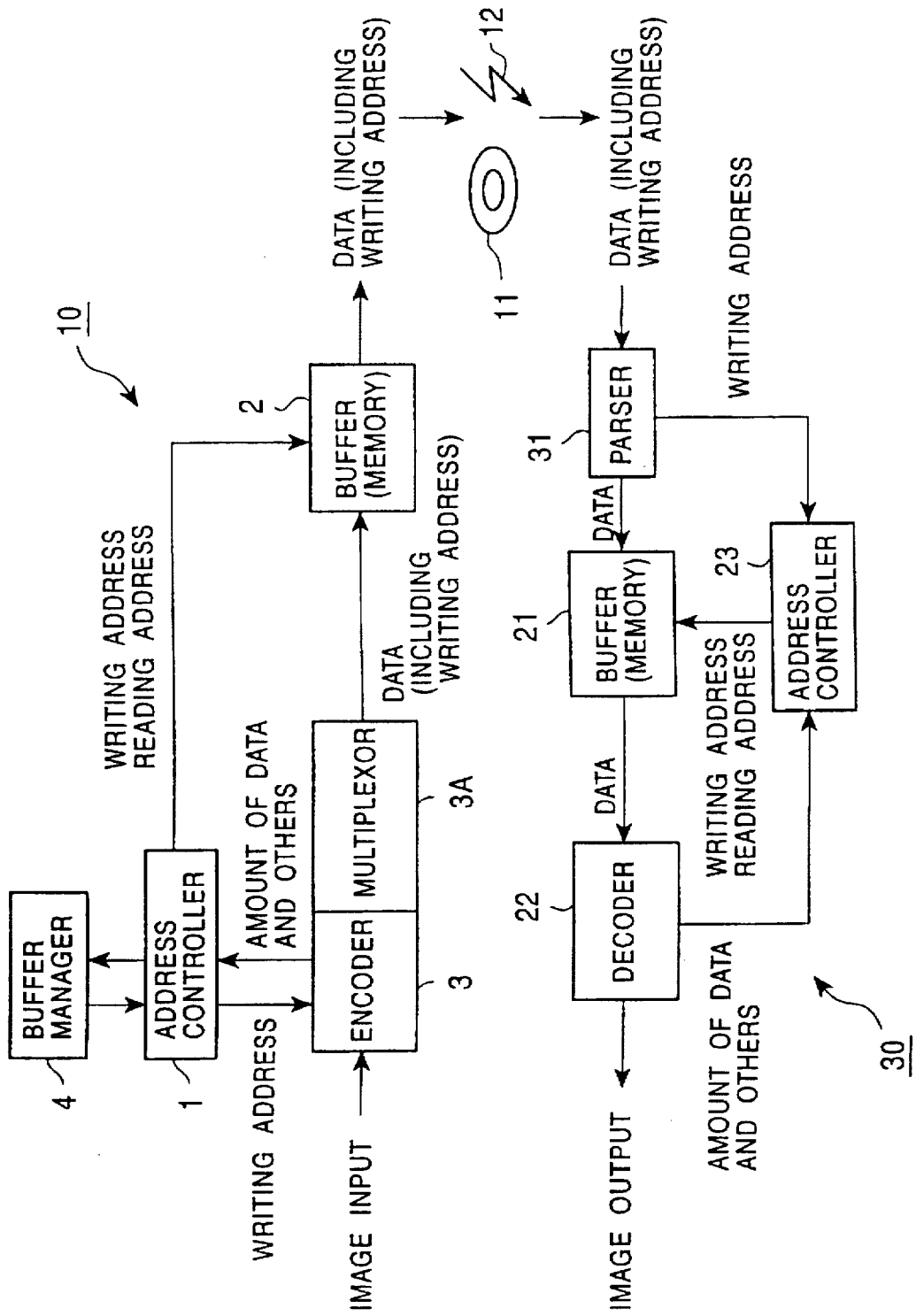
FIG. 8 is a block diagram of the configuration of an embodiment of a coding and decoding system obtained by the application of the present invention.

FIG. 8 illustrates the layout of an embodiment of a coding and decoding system obtained by the application of the present invention. This system is comprised of an encoding unit 10 and a decoding unit 30 corresponding to the encoding unit 110 and the decoding unit 130, respectively, shown in FIG. 1. The same elements as those shown in FIG. 1 are designated by like reference numerals.

For solving the problem of the wraparound state, in this embodiment, not only the available capacity of the buffer 2 (first storage means), but also the present status of the buffer 2, is managed, and the management information is utilized in the encoder 3 (encoding means) for use in the encoding unit 10. More specifically, in the encoding unit 10, an input image is converted into coded data in the encoder 3 in a conventional manner, and is output and written into the buffer 2 through a multiplexor 3A (multiplexing means). During this operation, the writing address used for writing the coded data into the buffer 2 (for example, the leading address for writing data by a unit of macro block, slice, field or frame) is generated in the address controller 1 (generating means) and is supplied to the multiplexor 3A through the encoder 3. The multiplexor 3A then adds the writing address to the coded data in a multiplexing manner. Accordingly, the multiplexed data obtained from a combination of the coded data and the writing address is stored in the buffer 2.

In this embodiment, the writing address is determined by the address controller 1 based on the information supplied from a buffer manager 4. The buffer manager 4 has built-in virtual storage having the same address space as the buffer 2. Unlike the buffer 2, the virtual storage can only exercise address control of the buffer 2 and cannot store data (devoid of a data storage function). Supplied to the buffer manager 4 from the encoder 3 through the address controller 1 are coded data and information to be recorded (to be transmitted) concerning the amount of the data, parameters required for decoding operation, flags and so on (in this embodiment, unless otherwise specified, this information is included in the coded data). The buffer manager 4 assigns the information to its virtual storage and determines the zone of the buffer 2 to be used corresponding to the total amount of data in units of a predetermined group, whereby data management can be performed. The leading address of the zone of the buffer 2 determined in the buffer manager 4 is set as the writing address in the address controller 1 and is fed to the buffer 2 and the encoder 3. As a consequence, the multiplexed data obtained from a combination of the coded data and the writing address is sequentially written into the buffer 2 from the position of the writing address.

During this writing period, the buffer manager 4 determines the writing address for writing subsequent coded data (properly speaking, multiplexed data obtained by a combination of coded data and the writing address, hereinafter referred to as "the multiplexed data" as necessary). To put it more precisely, the buffer manager 4 specifies a zone for writing subsequent coded data. As described above, based on this zone, the writing address is determined in the address controller 1. During this operation, the buffer manager 4 specifies the writing address that does not cause the wraparound state. Then, at a timing of starting the writing period of subsequent multiplexed data, the writing address which has already been determined is supplied to the buffer 2 from the address controller 1, and according to this writing address, the multiplexed data output from the multiplexor 3A is stored in the buffer 2. Thereafter, processing in a manner similar to the above procedure is repeated.

Figure 9:
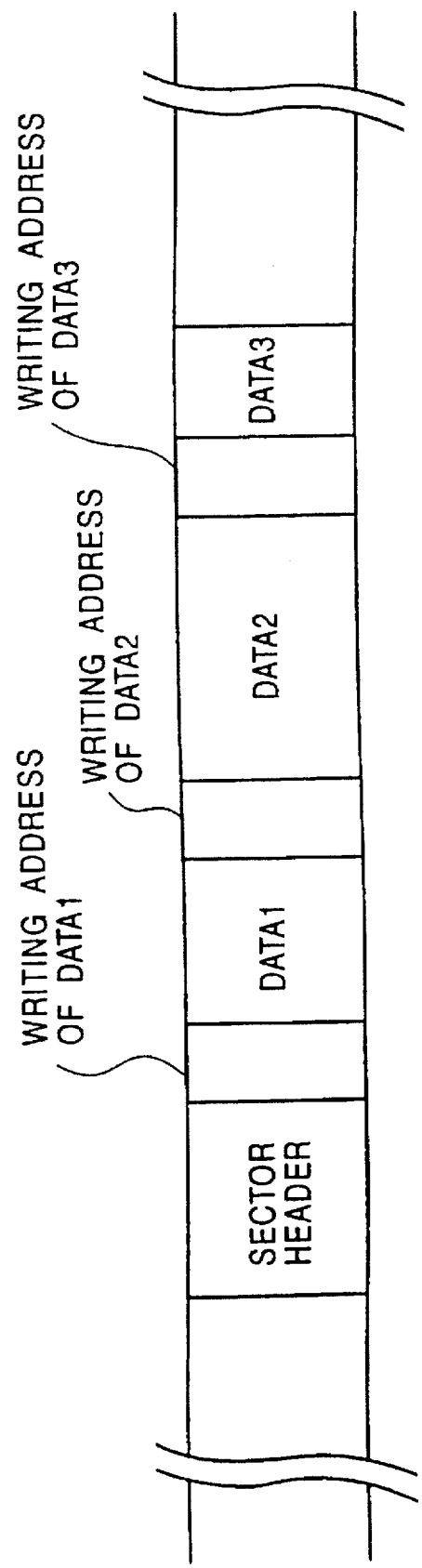
FIG. 9 illustrates the data format on the recording medium shown in FIG. 8.

The address controller 1 determines the reading address, as well as the writing address, and the multiplexed data written into the buffer 2 is read according to the reading address output from the address controller 1. Subsequently, the multiplexed data read from the buffer 2 is recorded in the recording medium 11 for recording images, such as Mini Disk (trade name), compact disks (video CD), other types of video disks (for example, digital video disks (DVD)). Alternatively, the data is transmitted through the transmission channel 12. The data format on the recording medium (disk) 11 can be indicated as shown in FIG. 9. The disk 11 comprises a plurality of tracks and sectors (only sectors shown). Each sector is formed of the sector header for recording various types of control data required for decoding coded data, and a data region for recording the coded data. Recorded in the data section are a plurality of items of multiplexed data obtained from a combination of coded data and the writing addresses, as shown in FIG. 9. The format of the multiplexed data shown in FIG. 9 is not exclusive, and a group of the writing addresses may be recorded in one place as long as the addresses are clearly related to the respective items of coded data.

In the conventional encoding unit 110 illustrated in FIG. 1, when the garbage collection method is employed, the buffer (memory) 2 can be used as FIFO memory, and based on the available capacity of the buffer 2, the amount of generated data (coded data) is controlled in the encoder 3, thereby preventing overflow and underflow of the buffer 2. When the two-bank method is employed, on the other hand, each bank can also be used as FIFO memory, and the amount of coded data can thus be controlled by only the available capacity of the buffer 2, in a manner similar to the garbage collection method, whereby overflow and underflow of the buffer 2 can be avoided. In the encoding unit 10, as well as the encoding unit 110, the available capacity of the buffer 2 is supplied to the encoder 3, although this is not shown in FIG. 8. In the encoder 3, the amount of generated data can be controlled in a manner similar to the conventional operation, whereby overflow and underflow of the buffer 2 can be precluded.

When the multiplexed data is recorded in the recording medium 11, it is reproduced in a reproducing apparatus (not shown) and is then input into the decoding unit 30. On the other hand, when the multiplexed data is transmitted via the transmission channel 12, it is received by a receiver (not shown) and is then input into the decoding unit 30. The decoding unit 30 receives the multiplexed data and analyzes it with the use of a parser (separation means) 36 so as to separate between the coded data and the writing address that has been transmitted as part of the coded data or side information. The writing address is then output to an address controller 23, while the coded data is output to a buffer (second storage means) 21. The address controller 23 supplies the writing address output from the parser 31 to the buffer 21, and according to this writing address, the coded data also output from the parser 31 is written into the buffer 21. The address controller 23 also feeds the reading address to the buffer 21, and based on this address, the coded data is read from the buffer 21 and is supplied to the decoder (decoding means) 22. The data is further decoded in the decoder 22 and output as a decoded image. When the data is decoded in the decoder 22, the amount of coded data and other information can be obtained to be fed back to the address controller 23 and used for exercising the address control of the buffer 21. It should be noted that the buffer 21 has at least the same storage capacity as the buffer 2 for use in the encoding unit 10.

Figure 10:
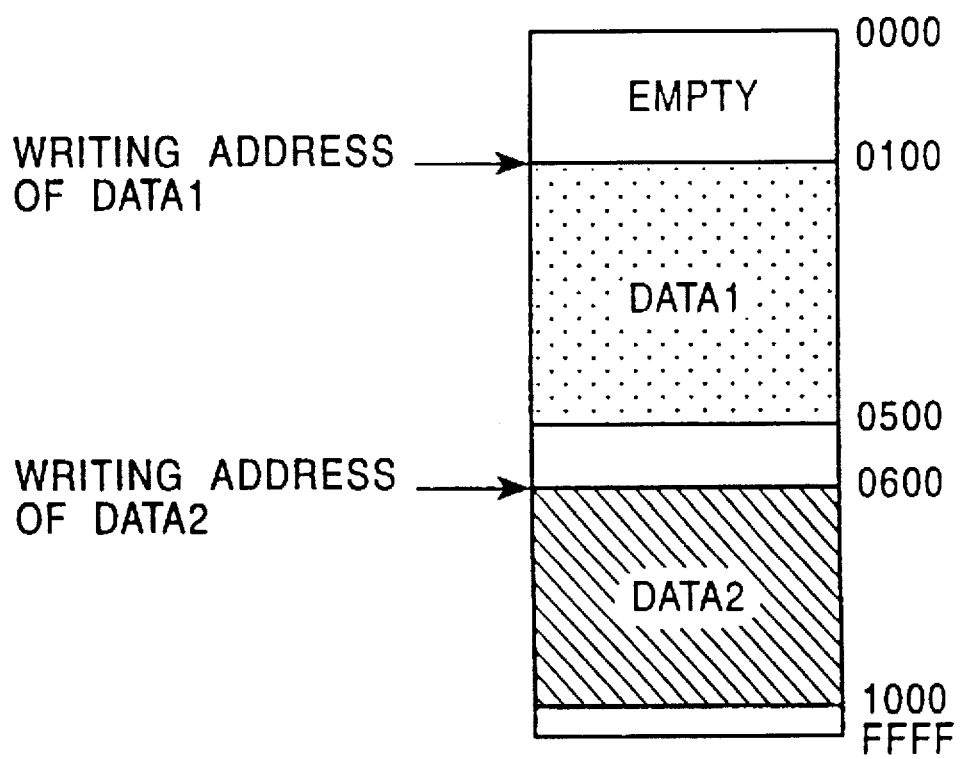
FIG. 10 illustrates a control method for the buffer 2 shown in FIG. 8.
Figure 12A:
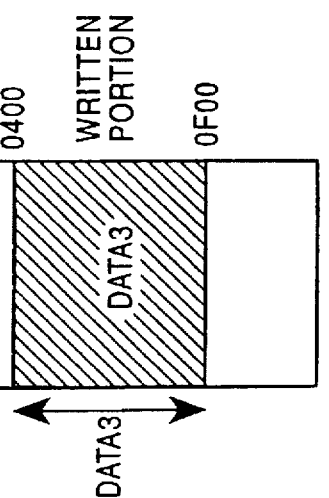
FIG. 12, which is comprised of FIGS. 12A, 12B, 12C and 12D, illustrates a control method for the buffer 21 shown in FIG. 8.
Figure 12B:
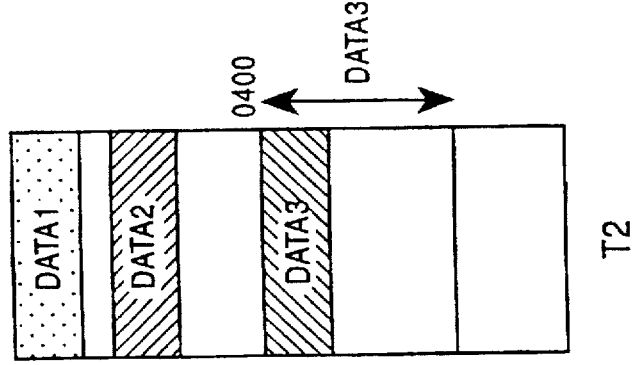
Figure 12C:
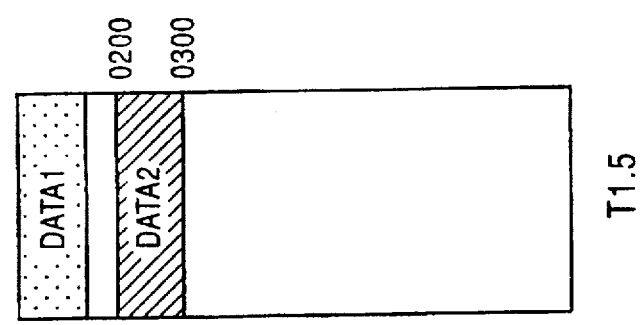
Figure 12D:
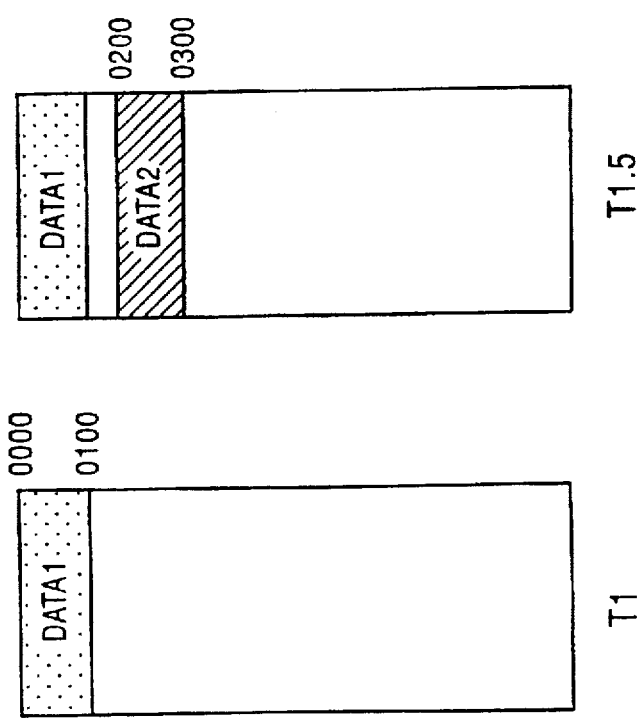

A detailed explanation will now be given of a control method of the buffer 2 for use in the encoding unit 10 with reference to FIG. 10. FIG. 10 illustrates the address space (memory map) of the buffer 2.

At a timing of continuously encoding data, when multiplexed data 1 (data 1) is stored in the zone in a range from address 0100 to 04FF of the buffer 2, the writing address for storing data 2 to be subsequently processed in the buffer 2 is determined by the buffer manager 4 in the following manner. The buffer manager 4, referring to its built-in virtual storage, recognizes that the zone (a range from address 0100 to 04FF) in which the data 1 is already stored is not available. In the address space of the buffer 2, the zone from address 0000 to 00FF and the zone from address 0050 to FFFF across the unavailable zone from address 0100 to 04FF are available. The buffer manager 4 selects, for example, the wider zone of the two, to be used as a zone into which the data 2 is written. Accordingly, as shown in FIG. 10, the zone from address 0500 to FFFF is determined as a zone for writing the data 2. The address controller 1 specifies, based on the zone determined above, the writing address for writing the data 2. As illustrated in FIG. 10, address 0600 is set as the writing address for writing the multiplexed data 2 which is then written into the zone from address 0600 to 0FFF.

The multiplexed data written into the buffer 2 is read in accordance with the reading address output from the address controller 1. Upon completion of the reading of the data 1 and the data 2, both of them are erased so that available zones can be created in the buffer 2. The buffer manager 4 then executes control over the available zones repeatedly in a manner similar to the operation as discussed above.

In the buffer 2 shown in FIG. 10, a slightly small redundant zone (from address 0500 to 05FF) is disposed between the zones in which the data 1 and the data 2 are respectively stored. The provision of such a redundant zone and its size are voluntary. Additionally, when the encoder 3 carries out encoding operation in compliance with the MPEG standards, the upper limit of the amount of data to be generated in a unit of time is specified. The capacity of the buffer 2 is determined based on this upper limit. This can prevent overflow of the buffer 2, such as the state in which the available zone of the buffer 2 after the data 1 has been written is not sufficient for storing the data 2.

Figure 6:
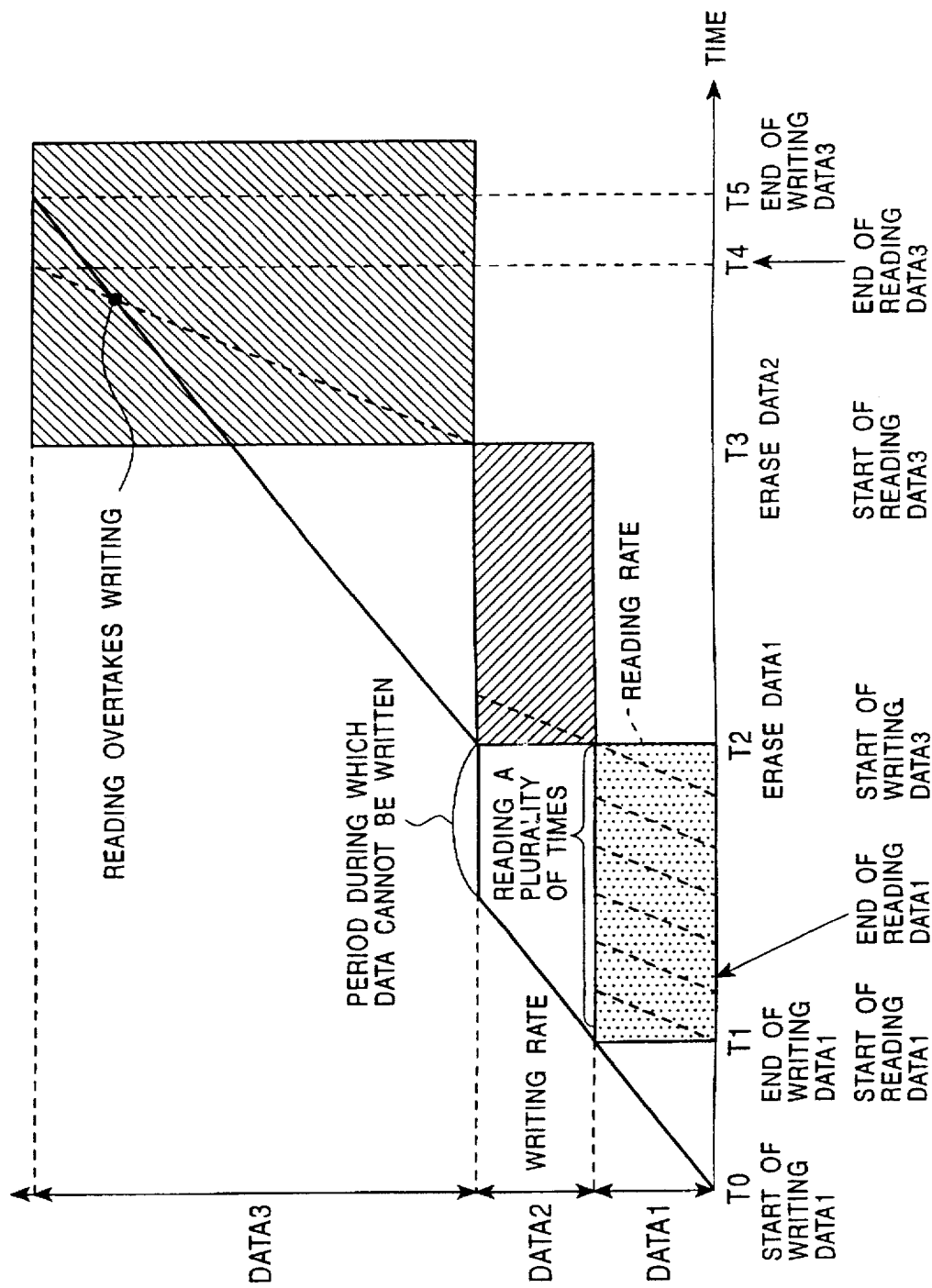
FIG. 6 illustrates the writing and reading of the data according to the two-bank method.
Figure 7A:
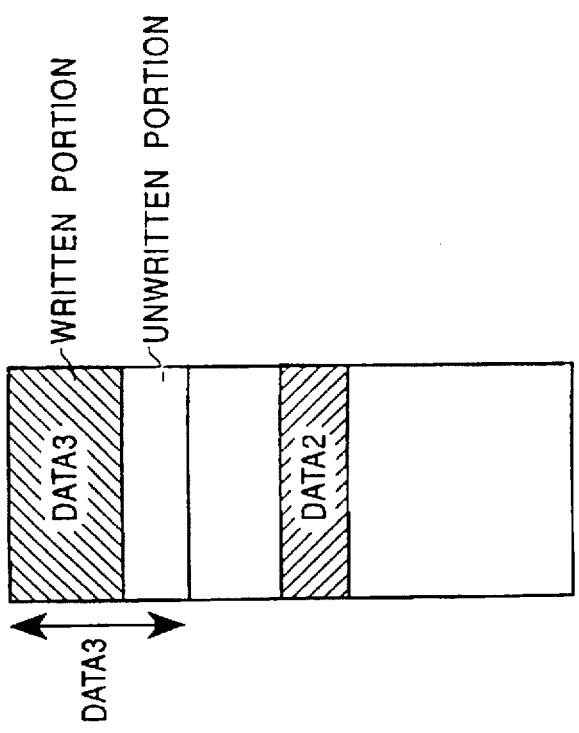
FIG. 7, which is comprised of FIGS. 7A, 7B and 7C, illustrates the status of the buffer 2 shown in FIG. 1 when writing and reading of the data is performed according to the two-bank method.
Figure 7B:
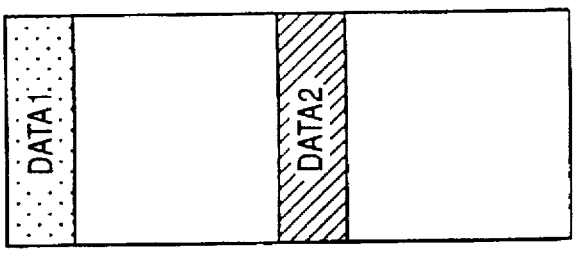
Figure 7C:
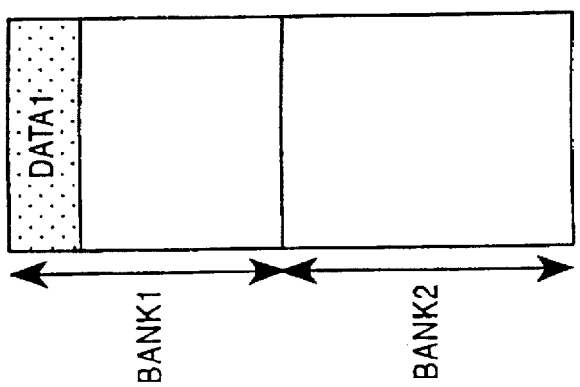

A detailed description will further be given of a control method of the buffer 21 for use in the decoding unit 30 with reference to FIG. 11. FIG. 11, as well as FIG. 6 discussed above, indicates a lapse of time when the coded data input into the decoding unit 30 in the order of data 1, 2 and 3 is written into and read from the buffer 21. In FIG. 11, as well as FIG. 6, the writing of the coded data 1 into the buffer 21 is started at time T0 and is ended at time T1. Concurrently, at time T1 the reading of the data 1 from the buffer 21 is initiated, and the writing of the data 2 into the buffer 21 is also started. The data 1 and the data 2 are written into the buffer 21 according to the writing addresses combined with the respective data 1 and data 2 in a multiplexing manner.

In this operation, the data 1 may be, in some cases, read a plurality of times during the period from time T1 to T2. During this period, as discussed above, the data 1 cannot be erased and is required to be stored in the buffer 21 until time T2. On the other hand, FIG. 11 shows that the writing of the data 2 into the buffer 21 is finished at time T1.5 earlier than time T2. The control method of this embodiment differs from the conventional method as described above in that it is possible to write data into the buffer 21 even though the data 1 has not been erased from the buffer 21. More specifically, the multiplexed data obtained from a combination of the coded data and the writing address is input into the decoding unit 30, and the coded data is written into the buffer 21 in accordance with the writing address. This writing address is determined in such a manner that overflow of the buffer 2 for use in the encoding unit 10 can be avoided. This guarantees the positive writing operation of the coded data into the buffer 21 as long as the operation is pursuant to the writing address.

Thus, immediately after the writing of the data 2 into the buffer 21 is ended at T1.5, the writing of the subsequent data 3 can be started. In FIG. 11, as well as in FIG. 6, at time T2 the data 1 is erased from the buffer 21, and the reading of the data 2 is commenced. Subsequently, at time T3 the data 2 is erased from the buffer 21, and at the same time, the reading of the data 3 is started.

In the decoding unit 30, the writing of the data 3 into the buffer 21 can be initiated at time T1.5 earlier than time T2 which has been conventionally started, that is, immediately after the writing of the data 2 has been finished. Hence, the writing of the data 3 is ended at time earlier than T4 at which the reading of the data 3 is finished (time T3 in FIG. 11). It is thus possible to prevent the state in which the reading operation overtakes the writing operation. To explain this with reference to FIG. 11, it is possible to avoid the state in which the solid line indicating the writing rate crosses with the dotted line representing the reading rate. This can ensure that the writing operation reliably precedes the reading operation. Underflow of the buffer 21 and overflow of the data can thus be avoided.

FIG. 12 illustrates the status (address space) (memory map) of the buffer 21 at time T1, T1.5, T2 and T3. FIG. 12A indicates the status of the buffer 21 at T1 at which the writing of the data 1 into the zone from address 0000 to 00FF is ended. The address 0000 has been combined with the data 1 in a multiplexing manner. Though not shown in FIG. 12A, at time T1 the writing of the data 2 into the buffer 21 is started, and the reading of the data is also commenced. At time T1.5, as illustrated in FIG. 12B, the reading of the data 1 written in the zone from address 0000 to 00FF has already been started, and the writing of the data 2 into the zone from 0200 to 02FF is ended. The address 0200 has been combined with the data 2 in a multiplexing fashion. Although not shown in FIG. 12B, at time T1.5 the writing of the data 3 into the buffer 21 is commenced. As shown in FIG. 12C, at time T2 the data 1 stored in the zone from address 0000 to 00FF is about to be erased, and the reading of the data 2 stored in the zone from address 0200 to 02FF is initiated. Further, at time T2 the writing of a predetermined amount of data 3 into the zone starting from address 0400 has been finished. The address 0400 has been combined with the data 3 in a multiplexing fashion. At time T3, as shown in FIG. 12D, the data 1 has already been erased from the buffer 21, and the data 2 is about to be erased. At the same time, the writing of the data 3 into the zone from address 0400 to 0EFF is completely finished and the reading thereof is about to be started.

In the manner described above, since the writing address for the data written into the buffer 21 is specified in units of a predetermined group, the writing of the data can be started without waiting until the other data is erased. Namely, the data can be written without the need for securing an available zone by erasing the other data. Also, the writing address is determined in such a manner that the wraparound state can be avoided in the encoding unit 10. This also prevents the wraparound state in the decoding unit 30. That is, the coded data combined with the writing address is input into the decoding unit 30, thereby readily avoiding the wraparound state. Further, the other problems inherent in the garbage collection method and the two-bank method can be prevented.

As discussed above, the two-bank method presents a problem of restricting the amount of data to be handled by the size of each bank. The method of this embodiment, however, has the flexibility of taking advantage of the overall size of the buffer 21 (2) without being limited by such restrictions. It is further possible to effectively use the buffer 2 (21) when the encoder 3 performs multipath coding.

A brief explanation will now be given of the multipath coding method. According to this method, an input image is first coded by standard parameters (for example, quantizing step), whereby the amount of coded data and other information can be obtained. This information is stored in predetermined memory (not shown) in such a manner that it can correspond to the input image. Subsequently, based on this information, optimum parameters are set, for example, to keep the quality of the decoded image and the amount of generated data in balance, and then, the input image is once again coded. In this manner, the above-described coding operation is repeated. This is referred to as "the multipath coding method". In this method, the amount of data coded by the standard parameters can be found prior to the coding operations for a second time and afterwards. Accordingly, sufficient bit allocation can be made on the data coded after the first coding operation when the data is recorded in the recording medium 11 or transmitted via the transmission channel 12.

FIG. 13 illustrates the status (memory map) of the buffer 2 when the multipath coding operation is employed (for example, when the coding operation is performed by the use of the standard parameters). As illustrated in FIG. 13A, when data 1 is written into the zone from address 0500 to 0EFF at time T1, data 2 can be written into the zone from 0F00 to FFFF, which is the larger empty zone than the other available zone. In this embodiment, the data 2 is written into the zone from address 1000 to 13FF, as shown in FIG. 13B. As described above, since the multipath coding operation is not employed, the amount of data 3 to be written into the buffer 2 is unknown. As illustrated in FIG. 13C, the data 3, having a larger quantity, cannot be written into the zone starting from the consecutive address followed by the data 2. If the data 3 is forced to be written into the buffer 2, the wraparound state occurs.

In contrast, FIG. 14 illustrates the status of the buffer 2 when the multipath coding operation is carried out. In this case, the amount of data 3 can be recognized in advance at time T3 from the information provided while the multipath coding operation is conducted. FIG. 14A, as well as FIG. 13A, shows that the data 1 is stored in the zone from address 0500 to 0EFF at time T1. Then, the data 2 can be written into the consecutive smaller empty zone starting from address 0000 at time T2, as shown in FIG. 14B. The writing address 0000 for writing the data 2 into the zone is generated in the address controller 1 based on the information supplied from the address manager 4. Meanwhile, it is already known that the data 3 having a larger quantity will be written into the buffer 2. At time T3, the data 3 is thus written into the larger empty zone starting from the address 0F00. FIG. 14 shows that the data 3 is written into the consecutive zone starting from address 1000. In this manner, effective use of the buffer 2 (21) can be achieved without causing the wraparound state. In this embodiment illustrated in FIG. 14, the data 1, 2 and 3 are combined with the writing addresses 0500, 0000 and 1000, respectively, in a multiplexing manner.

According to the coding and decoding system shown in FIG. 8, the problem of the wraparound state can be solved without employing the garbage collection method or the two-bank method.

Although in this embodiment the buffer 2 or 21 is independently provided, this is not exclusive. Instead, if the encoding unit 10 and the decoding unit 30 each have, for example, memory for storing a signal for determining the ease of detection of image degradation, the memory may be doubled as the buffer 2 or 21. Also, although in this embodiment the coded data is stored in the buffer 2 after it has been combined with the writing address, the multiplexing operation may be performed after the coded data is read from the buffer 2. Additionally, in this embodiment the multiplexor 3A is provided independently of the encoder 3. However, when the encoder 3 has a built-in multiplexor for combining the coded data with other information to be recorded (or transmitted), such as the amount of data, parameters required for decoding the data, flags, etc, such a built-in multiplexor, may be used as the multiplexor 3A.

As will be clearly understood from the foregoing description, the present invention offers the following advantages.

According to the encoding method and the encoding unit of the present invention, the coded data is combined with the address for storing the coded data in storage means. This makes it possible to prevent underflow of, for example, memory provided for the decoding unit and for storing the coded data.

According to the decoding method and the decoding unit of the present invention, the input data is separated between the coded data and the address for storing the data in the storage means, and then, the coded data is stored in the storage means according to the address. This can also avoid underflow of the storage means.

The recording medium of the present invention stores in the storage means the coded data in which moving images have been coded and the address used for storing the data, thereby making it possible to prevent underflow of the storage means.

According to the transmission method of the present invention, both the coded data in which moving images have been coded and the address for storing the data in the storage means are transmitted. It is thus possible to prevent underflow of, for example, memory used for storing the coded data and provided for the decoding unit that receives the above data and the address.

According to the coding and decoding system of the present invention, the coded data is combined with the address for storing the data in the first storage means in a multiplexing manner. The multiplexed data is then separated between the coded data and the address, and the data is then stored in the second storage means according to the address. This can avoid underflow of the second storage means.

What is claimed is:

1. A moving-image coding method comprising the steps of:
   performing a predetermined coding operation on an input moving-image signal to generate coded data;
   receiving information pertaining to first and second portions of the coded data to be stored in storage means and generating respective write addresses representing the positions in which said first and second portions of the coded data are to be written into said storage means so as not to cause a wraparound condition to occur in said storage means; and combining said coded data with said writing addresses in a multiplexing manner to generate multiplexed data.

2. A moving-image coding method according to claim 1, wherein said writing addresses are generated in such a manner that addresses of said storage means are consecutively arranged between the writing start address and the writing end address.

3. A moving-image coding method according to claim 1, wherein said writing addresses are generated in such a manner that the writing end address is always greater than the writing start address.

4. A moving-image coding method according to claim 1, wherein the receiving and generating step includes determining whether the amount of said coded data fits into the available capacity of said storage means, and upon this determination, determining the respective writing address.

5. A moving-image coding method according to claim 4, wherein the respective writing address is generated in such a manner that the writing end address is always greater than the writing start address within the available capacity of said storage means.

6. A moving-image coding method according to claim 1, further comprising the steps of:

generating reading addresses for reading from said storage means the stored coded data; and writing said coded data into said storage means according to the respective writing addresses and reading from said storage means the stored coded data according to said reading addresses.

7. A moving-image coding method according to claim 6, wherein the rate at which said coded data is read from said storage means is higher than the rate at which said coded data is written into said storage means.

8. A moving-image coding unit comprising:

coding means for performing a coding operation on an input moving-image signal to generate coded data;

storage means having a predetermined storage capacity for storing said coded data;

address generating means for receiving information pertaining to first and second portions of the coded data to be stored in said storage means and for generating respective write addresses representing the positions in which said first and second portions of the coded data are to be written into said storage means so as not to cause a wraparound condition to occur in said storage means; and multiplexed-data generating means for combining said coded data with said writing addresses in a multiplexing manner to generate multiplexed data.

9. A moving-image coding unit according to claim 8, wherein said address generating means generates said writing addresses in such a manner that addresses of said storage means are consecutively arranged between the writing start address and the writing end address.

10. A moving-image coding unit according to claim 8, wherein said address generating means generates said writing addresses in such a manner that the writing end address is always greater than the writing start address.

11. A moving-image coding unit according to claim 8, wherein said address generating means determines whether the amount of said coded data fits into the available capacity of said storage means, and upon this determination, determines the respective writing address.

12. A moving-image coding unit according to claim 11, wherein the respective writing address is generated in such a manner that the writing end address is always greater than the writing start address within the available capacity of said storage means.

13. A moving-image coding unit according to claim 8, wherein said address generating means includes means for generating reading addresses for reading from said storage means the stored coded data and means for writing said coded data into said storage means according to the respective writing addresses and reading from said storage means the stored coded data according to said reading addresses.

14. A moving-image coding unit according to claim 13, wherein the rate at which said coded data is read from said storage means is higher than the rate at which said coded data is written into said storage means.

15. A moving-image decoding method for decoding coded data including predetermined control information, comprising the steps of:

separating said predetermined control information and coded moving-image data from said coded data, said control information including writing addresses representing the respective positions in which first and second portions of said coded moving-image data are to be written into storage means so as not to cause a wraparound condition to occur in said storage means;

writing said coded moving-image data into said storage means according to said writing addresses;

reading said coded moving-image data from said storage means after said data has been stored in said storage means; and decoding said coded moving-image data read from said storage means to generate moving-image data.

16. A moving-image decoding method according to claim 15, wherein said writing addresses are set in such a manner that addresses of said storage means are consecutively arranged between the writing start address and the writing end address.

17. A moving-image decoding method according to claim 15, wherein said writing addresses are set in such a manner that each respective writing end address is always greater than the writing start address.

18. A moving-image decoding method according to claim 3, wherein a determination is made as to whether the amount of said coded data fits into the available capacity of said storage means, and upon this determination, the respective writing address is set.

19. A moving-image decoding method according to claim 18, wherein the respective writing address is set in such a manner that the writing end address is always greater than the writing start address within the available capacity of said storage means.

20. A moving-image decoding method according to claim 15, further comprising the step of generating reading addresses for reading from said storage means the stored coded data, wherein said coded data is written into said storage means according to the respective writing addresses and said stored coded data is read from said storage means according to said reading addresses.

21. A moving-image decoding method according to claim 20, wherein the rate at which said coded data is read from said storage means is higher than the rate at which said coded data is written into said storage means.

22. A moving-image decoding unit for decoding coded data including predetermined control information, comprising:

storage means for temporarily storing data;

separation means for separating said control information and coded moving-image data from said coded data, said control information including writing addresses representing the respective positions in which first and second portions of said coded moving-image data are to be written into said storage means so as not to cause a wraparound condition to occur in said storage means;

writing means for writing said coded moving-image date into said storage means according to said writing addresses;

reading means for reading said coded moving-image data from said storage means after the data has been stored in said storage means; and means for decoding said coded moving-image data read from said storage means to generate moving-image data.

23. A recording medium in which coded data is recorded for use with an encoding unit and/or a decoding unit, comprising:

a header section for recording control data for controlling said coded data; and a data section for recording said coded data and writing addresses in a multiplexing manner, each of said writing addresses represents a respective position in which a portion of said coded data is written into storage means provided in the appropriate one of the encoding unit or the decoding unit such that first and second portions of the coded data are written into said storage means so as not to cause a wraparound condition to occur in said storage means.

24. A moving-image coding method according to claim 1, further comprising the step of transmitting said multiplexed data to a transmission channel.

* * * * *